(No Model.)
A. STRAUS.
RUBBER TIRE FOR BICYCLES.
No. 474,423. Patented May 10, 1892.
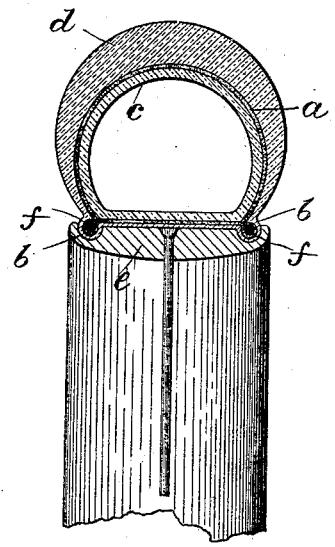
FIG. I.
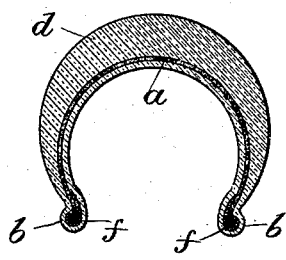
FIG. II.
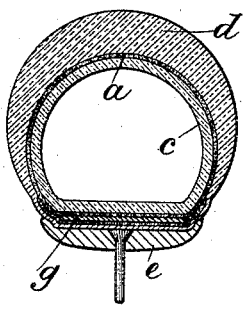
FIG. III.
Attest:
Geo. T. Smallwood.
Nathan Cilley.
Inventor:
Alexander Straus
by Pollok & Mauro
his attorneys.

UNITED STATES PATENT OFFICE.

ALEXANDER STRAUS, OF NEW YORK, N. Y., ASSIGNOR TO THE NEW YORK BELTING AND PACKING COMPANY, LIMITED, OF SAME PLACE.

RUBBER TIRE FOR BICYCLES.

SPECIFICATION forming part of Letters Patent No. 474,423, dated May 10, 1892.

Application filed April 27, 1891. Serial No. 390,658. (No model.) Patented in England May 20, 1891, No. 8,952.

*To all whom it may concern:*

Be it known that I, ALEXANDER STRAUS, a resident of New York city, county and State of New York, have invented a new and useful Improvement in Rubber Tires for Bicycles and other Vehicles, (which has been patented in Great Britain by Patent No. 8,952, dated May 20, 1891,) which improvement is fully set forth in the following specification.

The present invention relates to the manufacture of tires for bicycles and other vehicles, and particularly to tubular or hollow tires adapted to be inflated by air or gas under pressure.

The general object of the invention is to facilitate and cheapen the manufacture of such tires and to provide simple and effective means for securing them in place on the rim or felly of the wheel.

The principle of my invention and the preferred manner of carrying the same into effect can be most conveniently explained in connection with the accompanying drawings, in which—

Figure I is a cross-section of the improved tire, and Figs. II and III similar views illustrating modified forms of construction.

One feature of the invention is the formation of loops on the linen or canvas tube, through which a holding wire or band is passed for attachment of the tire to the properly grooved or channeled rim of the wheel.

In carrying out the invention I preferably proceed as follows: I first form a tube *a* of linen, canvas, or other suitable textile fabric and then take in a portion of the tube and by two parallel lines of stitching form the external loops or hollow beads *b*, Fig. 1, on the side of the tube which is to lie in contact with the rim. A rubber tube *c* is then inserted in the tube *b* and vulcanized by means of live steam, whose pressure forces the rubber tube against it permanently with the canvas tube *a*. The ends of the compound tube thus formed are then spliced, making an endless rubber-lined tube. Over this is vulcanized or cemented an outer covering or layer *d* of rubber, which may be lined with canvas on the under side. The rim or felly *e*, to which the tire is to be applied, is provided with parallel grooves or channels corresponding with the loops on the canvas tube, and the tire is secured to the rim by means of holding wires or bands *f*, which pass through the loops and fit in the grooves of the rim.

The tire may be inflated by means of a tube having a suitable valve.

Instead of making the tire as a complete tube, the construction illustrated in Fig. II, which shows a tire of semi-cylindrical form, may be adopted. This form of tire can be made of flat strips, and is therefore more easily produced. The loops *b* may of course be formed of separate pieces applied to the canvas tube instead of being formed integral therewith. For example, the loops may be formed on the edges of a canvas strip such as shown in Fig. II, which is placed over the rubber-lined canvas tube before the outer tube or cover of rubber is applied.

In Fig. III the tube *a* is shown as provided with a loop formed of a single strip *g*, attached to the outside of the tube and adapted to hold a band of considerable width. In this case the rim *e* would be shaped to correspond, as shown in Fig. III.

Having now fully described my said invention, what I claim is—

1. A hollow tire composed of layers of rubber and canvas or similar fabric and having a loop or loops formed on or applied to the canvas portion of the combined tube and adapted to receive a holding-wire, substantially as described.

2. A hollow tire composed of inner and outer layers of rubber and an intermediate layer of textile fabric provided with a loop or loops adapted to receive a holding wire or band for attachment of the tire to a grooved felly, subtantially as described.

3. A hollow tire composed of a tube of rubber and a tube of textile fabric provided with external parallel loops for holding wires, in combination with a rim or felly having grooves corresponding with the loops, substantially as described.

4. The method of manufacturing hollow tires by making a tube of textile fabric, forming a loop or loops thereon, inserting a rubber tube and vulcanizing the latter by steam admitted under pressure to the interior thereof, splicing the ends of the compound tube thus formed, and covering the same with a layer of rubber, substantially as described.

In testimony whereof I have signed this specification in the presence of two subscribing witnesses.

ALEXANDER STRAUS.

Witnesses:
VICTOR E. BURKE,
GEO. ARMS.